(12) United States Patent
May et al.

(10) Patent No.: US 6,850,536 B2
(45) Date of Patent: Feb. 1, 2005

(54) INTERCONNECTION DEVICE WITH INTEGRATED STORAGE

(75) Inventors: Philip E. May, Palatine, IL (US); Kent Donald Moat, Winfield, IL (US); Raymond B. Essick, IV, Glen Ellyn, IL (US); Silviu Chiricescu, Chicago, IL (US); Brian Geoffrey Lucas, Barrington, IL (US); James M. Norris, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 87 days.

(21) Appl. No.: 10/184,609

(22) Filed: Jun. 28, 2002

(65) Prior Publication Data

US 2004/0003200 A1 Jan. 1, 2004

(51) Int. Cl.[7] .................. H04L 12/50; H04L 12/54; H03M 13/00
(52) U.S. Cl. .................. 370/428; 370/383; 370/392; 370/395.71; 710/4; 714/776
(58) Field of Search .................. 370/218, 349, 370/357–383, 389, 392, 395.71, 395.7, 428, 438–440, 401, 465; 710/3–4, 9, 20; 712/1–9, 15, 20, 21; 714/776

(56) References Cited

U.S. PATENT DOCUMENTS

| 4,807,183 | A | * | 2/1989 | Kung et al. .................. 710/317 |
| 5,805,614 | A | * | 9/1998 | Norris .......................... 714/776 |
| 5,936,953 | A | * | 8/1999 | Simmons ..................... 370/364 |
| 2002/0080795 | A1 | * | 6/2002 | Van Wageningen et al. ........................ 370/395.3 |
| 2003/0128712 | A1 | * | 7/2003 | Moriwaki et al. .......... 370/412 |

* cited by examiner

Primary Examiner—Afsar Qureshi
(74) Attorney, Agent, or Firm—James A. Lamb

(57) ABSTRACT

An interconnection device (300) with a number of links (306, 308, 310, 312 and 314), each link having a number of link input ports (302), link output ports (304) and storage registers (316). An input selection switch (402) is coupled to a selected link input port to receive an input data token. The storage registers (316) may be used to store input data tokens. A storage access switch (404) is coupled to the input selection switch (402) and to the storage registers (316) and may be used to select the current input data token or a token from the storage registers as an output data token. An output selection switch (406) receives the output data token and provides it to a selected link output port. The interconnection device may, for example, be used to connect the inputs and outputs of the processing elements of a vector processor or digital signal processor.

20 Claims, 2 Drawing Sheets

INTERCONNECTION DEVICE WITH INTEGRATED STORAGE

CROSS REFERENCE TO RELATED APPLICATIONS

This application is related to co-pending patent applications titled "MEMORY INTERFACE WITH FRACTIONAL ADDRESSING" and identified by Ser. No. 10/184,582, "RE-CONFIGURABLE STREAMING VECTOR PROCESSOR" and identified by Ser. No. 10/184,583, "SCHEDULER FOR STREAMING VECTOR PROCESSOR" and identified by Ser. No. 10/184,772, "METHOD OF PROGRAMMING LINEAR GRAPHS FOR STREAMING VECTOR COMPUTATION" and identified by Ser. No. 10/184,743, which are filed on even day herewith and are hereby incorporated herein by reference.

FIELD OF THE INVENTION

This invention relates generally to the field of communication and storage for digital processors. More particularly, this invention relates to a communication link with integrated storage.

BACKGROUND OF THE INVENTION

Many new applications being planned for mobile devices (multimedia, graphics, image compression/decompression, etc.) involve a high percentage of streaming vector computations. The computation rate of these applications often exceeds that which the best general purpose CPU's can deliver. Therefore, it is desirable to find a means to improve the performance of the computation engine present in such devices to meet the computational requirements of these new applications.

Simultaneously, the nature of these new applications is that the standards and the best algorithms for complying with the standards are constantly changing, requiring a solution that is programmable and easy to program. Moreover, time to market pressures are increasing. One method for addressing this issue is to increase the reuse of previous investments in software and hardware. Reuse of hardware across multiple products is best promoted through programmability. Reuse of software is promoted through the use of a consistent programming model across multiple implementations of a device so that binary compatibility is maintained.

In a co-pending application entitled 'Re-configurable Streaming Vector Processor', hardware reuse is facilitated by the use of a re-configurable switch to interconnect processing elements. The interconnection switch can be reconfigured in each clock cycle to provide communication between the outputs and inputs of a number of function units (such as multiplier units, arithmetic units etc). In addition to a re-configurable interconnection switch, there is a need for result storage.

When a general pool of registers is used, a compiler must allocate registers to store intermediate results, for example when unrolling a loop. One method for simplifying this process is the use of rotating register windows. When using rotating register windows, a portion of the register file is accessed indirectly by combining the register name given by the compiler with a loop index maintained by the hardware. This effectively "renames" registers without the compiler having to allocate multiple registers (due to unrolling and pipelining different iterations of the loop). This mechanism provides a renaming of registers, but does not completely remove register names.

Register queues are a variation of rotating register windows with a slightly different hardware implementation. Rather than a rotating register file accessed by the register name and the loop index, unrolled loop registers are allocated to loop index accessed queues.

In U.S. Pat. No. 4,807,183, an invention is described that has FIFO/programmable delay storage on the input ports of a crossbar, and register-file named storage at the output ports of the same crossbar. Although this is storage associated with a communication fabric, the storage is inflexible as the ports (input and output) are dedicated to individual computing resources.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION OF THE INVENTION

Figure 1:
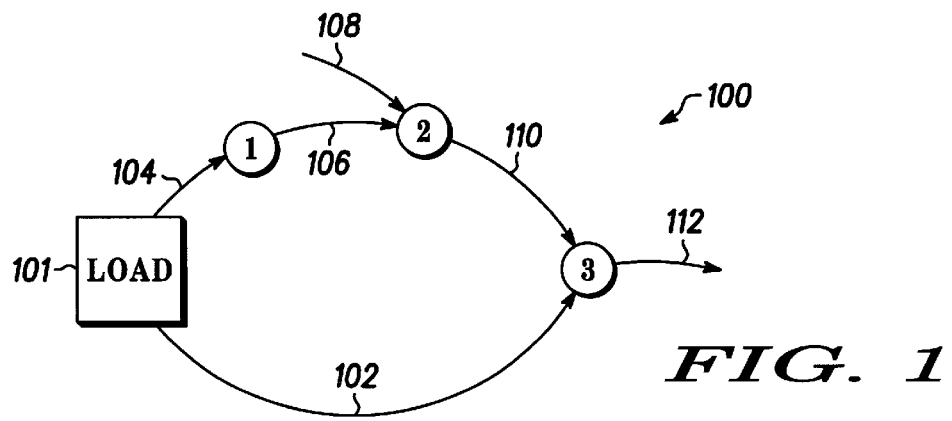
FIG. 1 is an exemplary data-flow graph fragment.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The invention relates to a flexible re-configurable communication fabric with integrated memory for storing intermediate results of data-flow based computations. The communication fabric includes an array of switches and data storage locations, and enables data-path elements to be interconnected into a pipeline specific to a particular data-flow graph.

There are many applications for the communication fabric of the present invention, one of which is the Re-configurable Streaming Vector Processor (RSVP), described in the co-pending patent application. The RSVP provides for high-performance streaming vector computations, based on a data-flow graph representation of an algorithm. The RSVP architecture also provides for the deep pipelining of computations, and is limited only by true data dependencies and the resource limitations of the current implementation. Communication is an integral part of this deep pipeline, and is indicated in the data-flow representation of the program by the arcs in the graph. In other words, these arcs are both explicit communication placeholders and implicit storage placeholders when the graph is pipelined. The present invention provides a device that facilitates a logical straightforward mapping of data-flow graphs to the compute/communication resources of a processor.

Motivation for the architecture of the present invention is provided by data-flow graph representations of computations. FIG. 1 shows an example mapping 100 of a data-flow graph fragment. Referring to FIG. 1, an initial data value is loaded block 101 and then communicated to node 1 as indicated by arc 104 and to node 3 by arc 102. Arc 104 implicitly provides storage for the initial data value. The data value is operated on by node 1, which computes a second data value as a function of the initial data value. In this example it is assumed that the computation at node 1 has a latency of one processor clock cycle. Similarly, the second data value is both communicated to node 2 and implicitly stored in arc 106. In this example it is assumed that the computation at node 1 has a latency of two processor clock cycles. Node 2 also receives an input from arc 108, which again is implicit storage. The result of the computation at node 2 is communicated to node 3 along arc 110. Node 3 operates on the initial data value and the output from node 2 to produce the final output on arc 112. It is apparent from this data-flow graph that data-flow arcs imply both communication and storage.

The interconnection device of the present invention similarly groups both communication and storage in the same structure. Further, since data-flow arcs are unnamed, it is logical that the storage provided in the device should also be unnamed. In prior processing systems, storage has been associated with the inputs or outputs of computational units or with a set of named registers.

Figure 2:
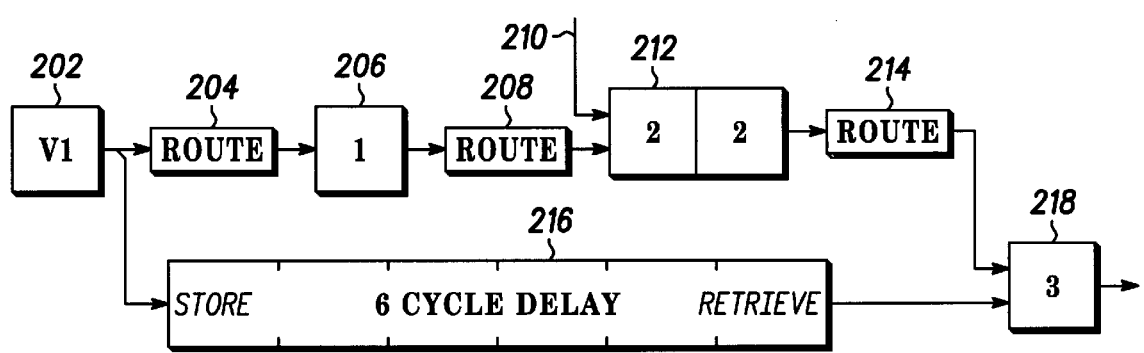
FIG. 2 is a hardware pipeline configured to implement the data-flow graph fragment of FIG. 1.

FIG. 2 is a block diagram of hardware pipeline configured to implement the data-flow graph shown in FIG. 1. Referring to FIG. 2, the data value is stored as V1 in storage block 202. In a first cycle the data is routed to computational unit (node 1) 206 via route 204. In a second cycle, the data is operated on by computational unit 206, in a third cycle the result of the computation is routed to computational unit 212 via route 208. In a fourth and fifth cycle, the data value 212 and the routed data value are operated on by computational unit 212. In a sixth cycle, the result from computational unit 214 is routed to the final computational unit 218 (node 3) via route 214. At the same time, the computation unit 218 requires the initial data value. Hence, in cycle one the initial data value is stored in a six-cycle delay line 216.

From this example it is clear that hardware to implement a data-flow graph should include delay-line storage in addition to simple storage and communication. The delay-line storage is used to balance different paths through the data-flow graph, each of which may encounter a different delay due to computational delay cycles.

Figure 3:
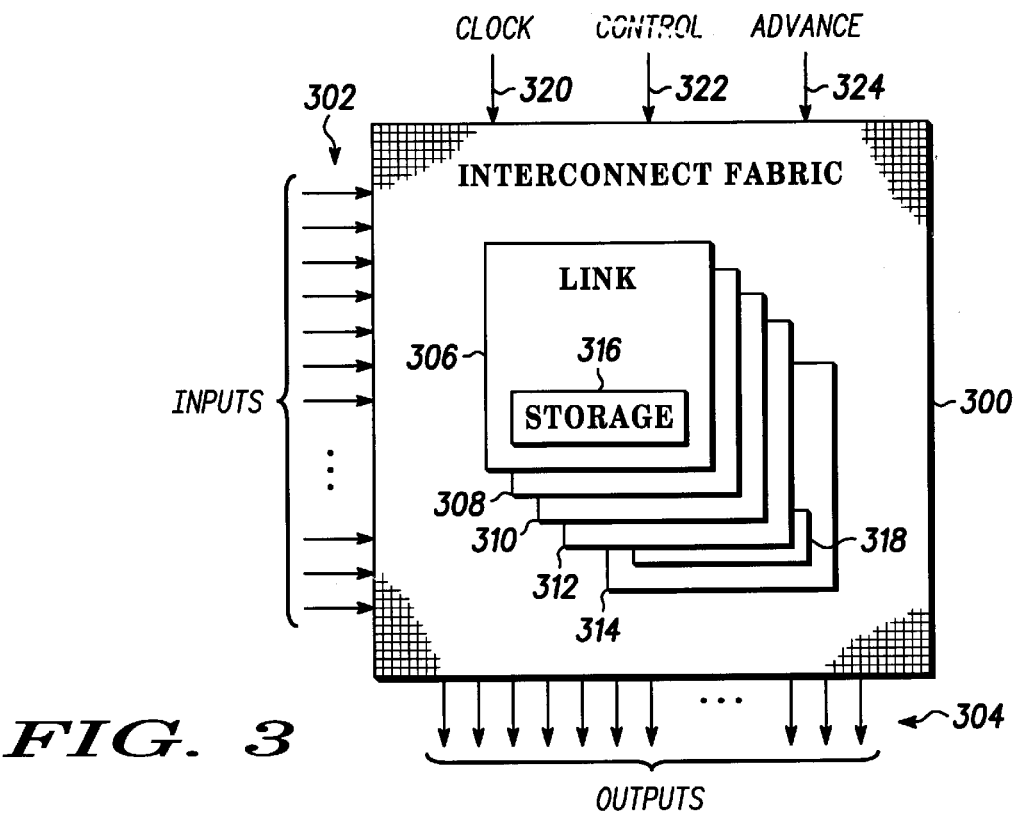
FIG. 3 is a diagrammatic representation of an interconnection device of the present invention.

FIG. 3 is a block diagram of the interconnection device (communication fabric) 300 of the present invention. The interconnection device 300 serves to interconnect a number of device inputs 302 to a number of device outputs 304. The interconnect device is composed of a number of point-to-point links 306, 308, 310, 312 and 314, each of which can connect one device input to one device output. In one embodiment, 48 16-bit inputs and 64 16-bit outputs are used together with 20 point-to-point interconnect links that can connect any 16-bit input to any 16-bit output. Each input and output may also be accompanied by an additional bit indicating the validity of the data. In a further embodiment, each output is connected to a latch for latching the output signals.

Associated with each link is a storage unit, comprising a number of storage registers. For example link 306 includes storage registers 316 and link 314 includes storage registers 318. These are discussed in more detail below with reference to FIG. 4. The interconnection device also includes input 320 for a processor clock signal, input 322 for a control signal and, optionally, input 324 for a memory advance signal. The control signal includes a source address, a destination address and specifies a delay for the storage registers. This enables the link to be operated to:

1. Store—put a result into storage
2. Get value n—retrieve a result that was placed in storage n stores ago.

Figure 4:
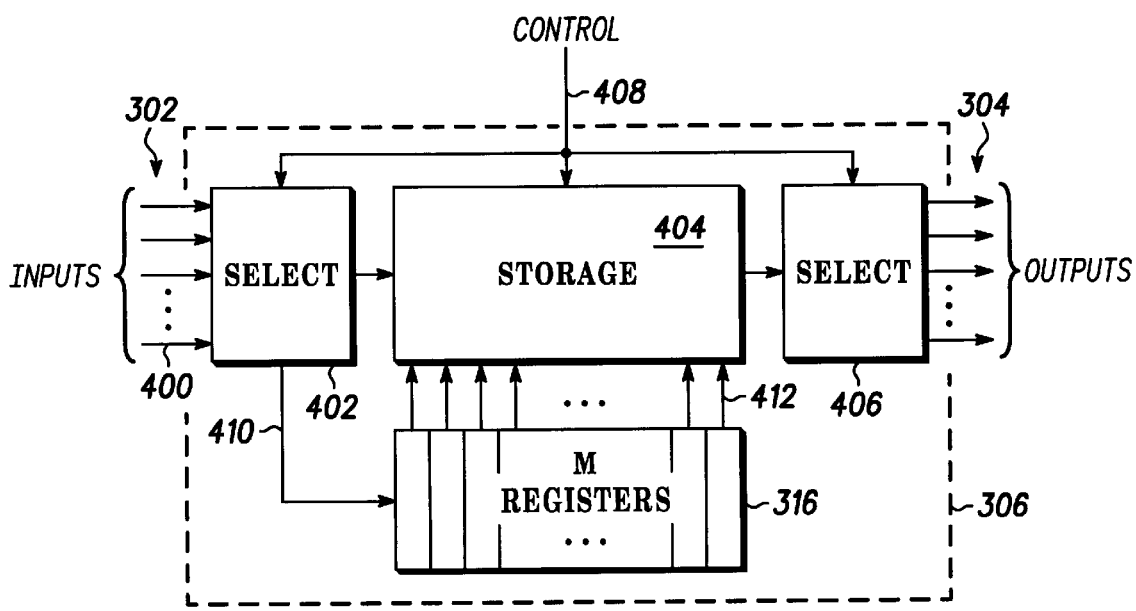
FIG. 4 is a diagrammatic representation of a link with storage in accordance with an embodiment of the present invention.

The composition of a link is shown in FIG. 4. Referring to FIG. 4, link 306 comprises an input selection switch 402, a storage access switch 404, an output selection switch 406 and a set of M storage registers 316. The link receives a control signal 408 that is used to control the switches 402, 404 and 406. At the input selection switch 402, one of the link inputs 400 is selected. The link inputs are coupled to all of the device inputs or to a subset of the device inputs. In the preferred embodiment, the data token from the selected input port pushed into the storage registers 316 if a non-zero delay is received, otherwise the input data token is coupled through the storage access switch 404 to the output selection switch 406. If the input data token is to be stored, it is pushed into the link storage registers via connection 410, displacing the token that has been stored for the longest time. Hence the link storage registers acts like a shift register or queue. In one embodiment, 15 registers are used in each link.

In a further embodiment, the storage access switch 404 and the output selection switch 406 are combined into a single switch.

The output data token may be selected to be the data token received at the selected link input port. Preferably, the link storage register 316 allows random access, with each register having a connection 412 to the interconnection switch. In this case the output data token may be the data token that was pushed into the storage registers a specified number of pushes previously. The delay portion of the control signal 408 is used to control the storage access switch 404. If the delay is zero, input data token is coupled through the storage access switch 404 to the output selection switch 406. Otherwise, the appropriate data token from the link storage registers is coupled through the storage access switch 404 to the output selection switch 406. The outputs are coupled to all of the device outputs or to a subset of the device outputs.

If one link is coupled only to a subset of the device inputs, one or more other links are provided that are coupled to the remainder of the device inputs.

The control signal 408 also includes a destination address that controls the output selection switch 406 to select a link output port. In this manner, any input to the link can be routed to any link output. Also, any input can be "pushed" into the link memory (store operation). The route and push can occur simultaneously. Alternatively, the fabric link can be used to "get" a stored value and route it to any of the link outputs. The mechanism for getting a value is to specify the number of stores in the past the value was pushed. This completes the Push/Get(n) storage model. In this implementation, a 'get' operation and a 'route' operation may not be performed simultaneously. In further, the operations may be performed simultaneously.

The possible actions that can take place in the link are:

1. Route one input to one output.
2. Store one input in the link storage registers
3. Retrieve a data token from the link storage register.
4. Route with delay (i.e. store the input and retrieve a value from the storage and route it).

The combination of unnamed storage and communication-link based storage is advantageous because its architecture parallels that of the data-flow graph, simplifying the programming, compiling and scheduling models. Further, in the preferred embodiment, the number of links is less than the sum of the number of inputs and the number of outputs. Thereby reducing the amount of hardware required.

Each link may be coupled to all of the inputs or to a subset of the inputs to the communication fabric. Similarly, each link may be coupled to all of the outputs or to a subset of the outputs.

Optionally, each output may be coupled to latch to facilitate storage of the output data tokens prior to use by attached computational units.

In one embodiment, the control signal comprises a source address, a delay and a destination address. TABLE 1 describes the actions taken by the link in response to some example control signals.

TABLE 1

| SOURCE | DELAY | DESTI-NATION | ACTION |
|---|---|---|---|
| k | m | n | push a token on link source port k into queue, route queue location m to link output port n. |
| k | 0 | n | route link input port k to link output port n |
| k | — | 0 | push link input port k into queue |
| 0 | m | n | get queue location m and route to link output port n |
| 0 | 0 | 0 | do nothing |

When used in conjunction with a number of computational units, such as adders, multipliers, shifters, logic unit etc., the interconnect device of the current invention provides a re-configurable data-path that facilitates the implementation of computations described by data-flow graphs.

While the invention has been particularly shown and described with reference to a preferred embodiment, it will be understood by those skilled in the art that various changes in form and detail may be made therein without departing from the spirit and scope of the invention. It is evident that many alternatives, modifications, permutations and variations will become apparent to those of ordinary skill in the art in light of the foregoing description. Accordingly, it is intended that the present invention should embrace all such alternatives, modifications and variations as fall within the scope of the appended claims.

What is claimed is:

1. An interconnection device comprising a plurality of links wherein a link of the plurality of links comprises:

a plurality of link input pans;

a plurality of link output ports;

an input selection switch operable to couple to a selected link input port of the plurality of link input ports and to receive a current input data token therefrom;

a plurality of storage registers coupled to the input selection switch and operable to store the current input data token and a plurality of prior input data tokens;

a storage access switch coupled to the input selection switch and to the plurality of storage registers and operable to select the input data token or an input data token of the plurality of prior input data tokens as an output data token; and an output selection switch coupled to the storage access switch and operable to receive the output data token and provide it to a selected link output port of the plurality of link output ports.

2. An interconnection device in accordance with claim 1, wherein the link of the plurality of links further comprises a control input for receiving a control signal and wherein the input selection switch, the storage access switch and the output selection switch are responsive to the control signal.

3. An interconnection device in accordance with claim 2, wherein the control signal comprises:

a source address specifying the link input port to be selected;

a destination address, specifying the link output port to be selected; and a delay, specifying which of the plurality of storage registers and the selected link input port should provide the output data token.

4. An interconnection device in accordance with claim 1, wherein the plurality of storage registers operate as shift register, with the oldest stored data token being discarded when a new input data token is stored.

5. An interconnection device in accordance with claim 1, wherein the storage access switch and the output selection switch are combined.

6. An interconnection device in accordance with claim 1, wherein the interconnection device further comprises a plurality of device input ports and wherein the plurality of link inputs ports are coupled to at least a subset of the plurality of device input ports.

7. An interconnection device in accordance with claim 6, wherein a first link of the plurality of links is coupled to a first subset of the plurality of device input ports and a second link of the plurality of links is coupled to a second subset of the plurality of device input ports.

8. An interconnection device in accordance with claim 1, wherein the interconnection device further comprises a plurality of device output ports and wherein the plurality of link outputs ports are coupled to at least a subset of the plurality of device output ports.

9. An interconnection device in accordance with claim 1, wherein the number of link input ports is greater than the number of links.

10. An interconnection device in accordance with claim 1, wherein the number of output ports is greater than the number of links.

11. An interconnection device in accordance with claim 1, wherein the plurality of storage registers form a queue and the device is programmable to perform one of the actions of:

pushing a data token on a specified link input port into the queue and routing a specified queue location to a specified link output port;

routing a specified link input port to a specified link output port;

pushing a data token on a specified link input port into the queue;

retrieving the data token in a specified queue location and routing it to a specified link output port; and no action.

12. A method for routing a data signal from a selected input of a plurality, N, of inputs to a selected output of a plurality, M, of outputs, the method comprising, during an instruction cycle:

controlling a one-of-N input selection switch to couple to the selected input; and controlling a one-of-M output selection switch to couple to the selected output; and controlling the coupling of a plurality of storage delay-line registers that are dedicated for coupling only to the one-of-N input selection switch and the one-of-M output selection switch.

13. A method in accordance with claim 12, further comprising:

discarding the contents of a first register of the plurality of storage registers which contains the oldest stored data signal; and storing the data signal from the selected input in a second register of the plurality of storage registers.

14. A method in accordance with claim 13, further comprising operating the plurality of storage registers as a delay line.

15. A method in accordance with claim 13, wherein the first register and second registers are the same register.

16. A method in accordance with claim 12, further comprising latching the selected data signal at the selected output.

17. An interconnection device comprising a plurality of links wherein a of the plurality of links comprises:

a plurality of N link input ports;

a plurality of M link output ports;

a one-of-N input selection switch operable to couple to a selected link input port of the plurality of N link input ports and to receive a current input data token therefrom;

a one-of-M output selection switch operable to couple to a selected link output port of the plurality of M link output ports and to send a data token thereto; and a plurality of storage registers tat are dedicated for coupling only to the one-of-N input selection switch and the one-of-M output selection switch, wherein the link is responsive to a control signal that determines the coupling of the input selection switch, the output selection switch, and the plurality of registers.

18. The interconnection device according to claim 17, wherein the plurality of storage registers form a set of queueing registers for data tokens received from the one-of-N input ports when coupled to the one-of-N input selection switch, and form a set of randomly accessible registers for data tokens sent to the one-of-M output ports when coupled to the one-of-M output selection switch.

19. The interconnection device according to claim 17, further comprising a storage switch that accepts the control signal controls the coupling of the plurality of storage registers, the one-of-N input selection switch and the one-of-M output selection switch.

20. The interconnection device according to claim 19, wherein the storage switch couples the plurality of storage registers to at least one-of-N input selection switch and the one-of-M output selection switch, or alternatively couples the one-of-N input selection switch to the one-of-M output selection switch, or alternatively decouples the one-of-N input selection switch and the one-of-M output selection switch from the plurality of storage registers and each other.

* * * * *